(12) United States Patent
Neu

(10) Patent No.: US 6,491,119 B1
(45) Date of Patent: Dec. 10, 2002

(54) MECHANICAL WALKER

(76) Inventor: Franklin D Neu, 1810 Carmel Dr., Castro Valley, CA (US) 94546

(*) Notice: Subject to any disclaimer, the term of this patent is extended or adjusted under 35 U.S.C. 154(b) by 0 days.

(21) Appl. No.: 10/028,526

(22) Filed: Oct. 19, 2001

(51) Int. Cl.[7] .............................................. B62D 57/032
(52) U.S. Cl. ........................ 180/8.1; 180/8.6; 280/5.26; 901/1
(58) Field of Search ............................ 180/8.1, 8.2, 8.5, 180/8.6, 8.7; 280/5.2, 5.26, 5.3, 5.28, 5.32; 901/1; 301/5.1, 41.1

(56) References Cited

U.S. PATENT DOCUMENTS

| | | | |
|---|---|---|---|
| 5,361,186 A | * 11/1994 | Tanie et al. | 180/8.1 |
| 5,484,031 A | * 1/1996 | Koyachi et al. | 180/8.1 |
| 5,762,153 A | * 6/1998 | Zamagni | 901/1 |
| 2001/0054518 A1 | * 12/2001 | Buehler et al. | 180/8.6 |

* cited by examiner

*Primary Examiner*—Anne Marie Boehler
(74) *Attorney, Agent, or Firm*—Brian Beverly

(57) ABSTRACT

A mechanical walker comprises six legs extending from a sphere, the legs organized in a X-Y-Z axial configuration. The sphere and legs support a bearing member. A shell holds the sphere and legs to the bearing member. Movement is accomplished by applying downward force to one of three high legs to walk it over two anchor legs moving the device in the horizontal inclination of the selected high leg. The invention is capable of horizontal movement in six directions offset from each other by sixty degrees. Preferably downward force is applied to the selected high leg using a retractable actuating rod. Slots in the shell, and a groove and prominences in a bottom portion of the actuating rod, prevent the high leg from drifting horizontally. At least three mechanical walkers can support a platform or other conveyance means.

26 Claims, 10 Drawing Sheets

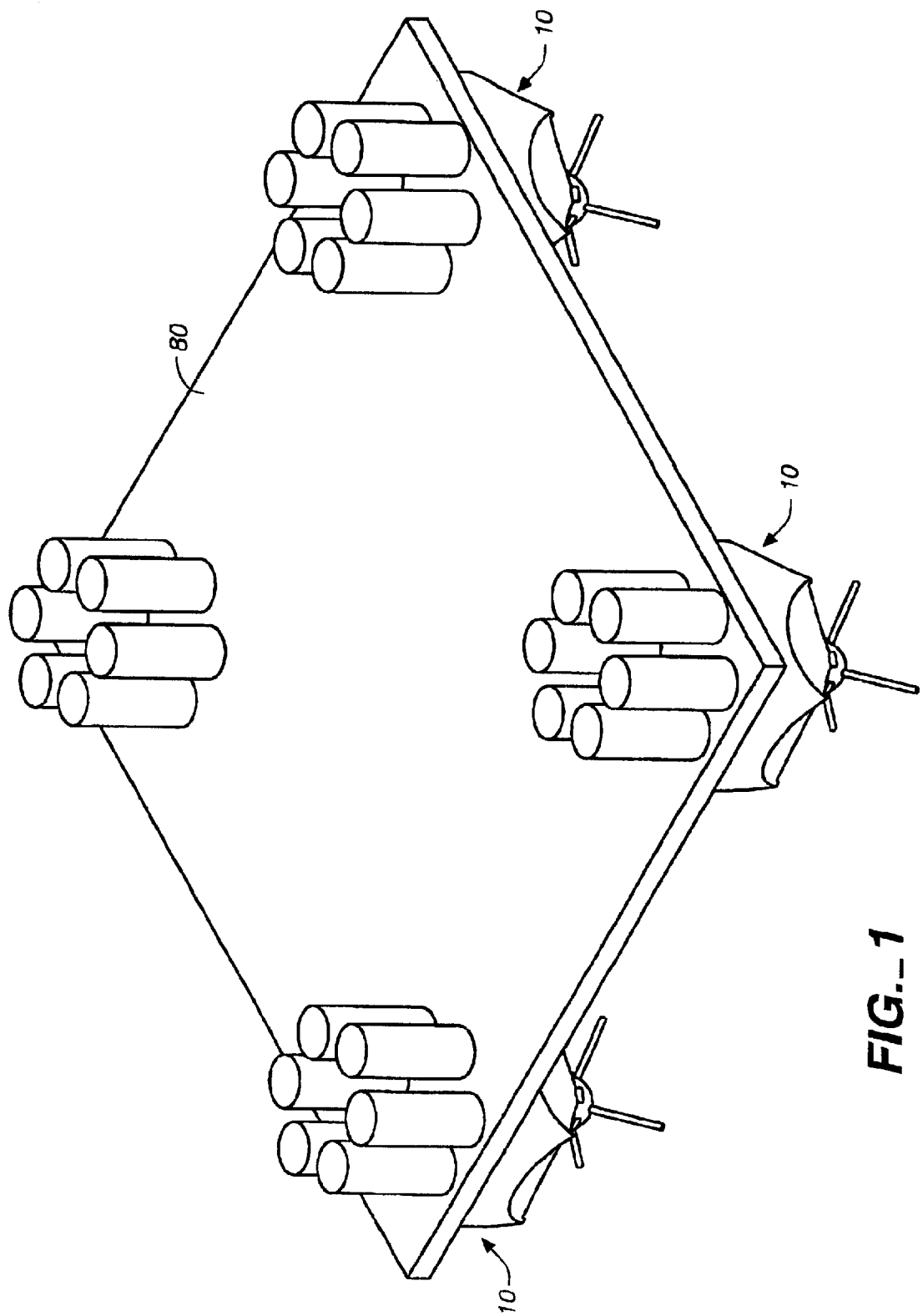
FIG._1

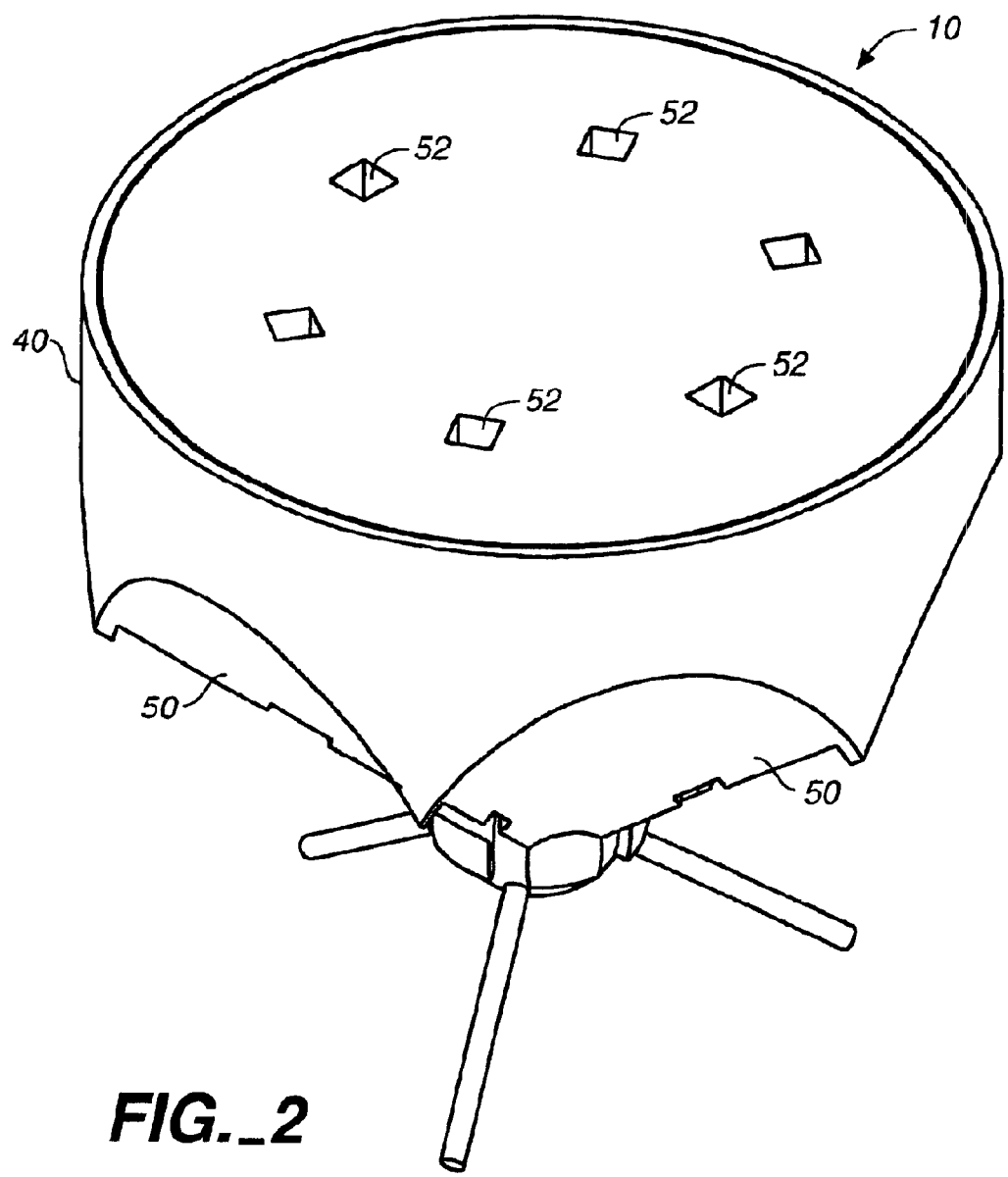
FIG._2

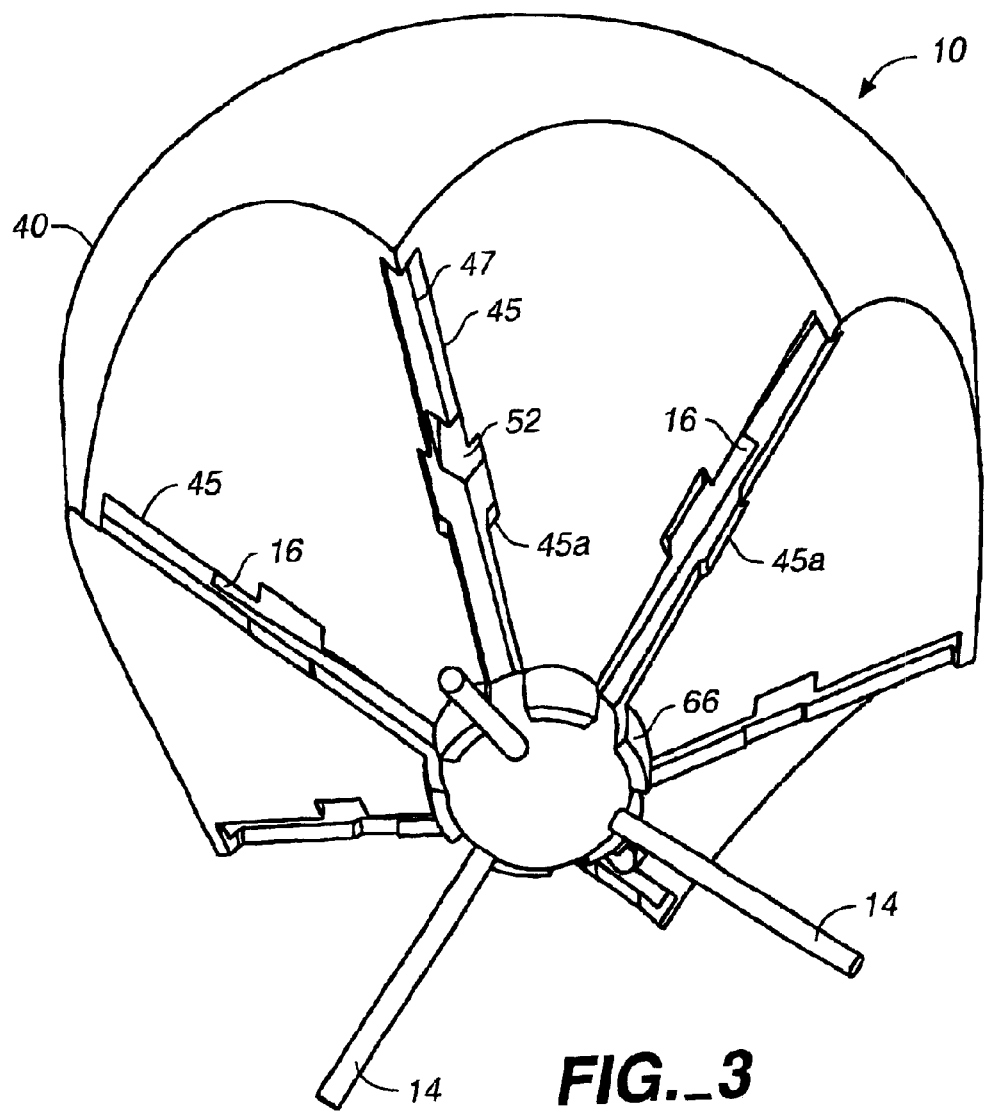
FIG._3

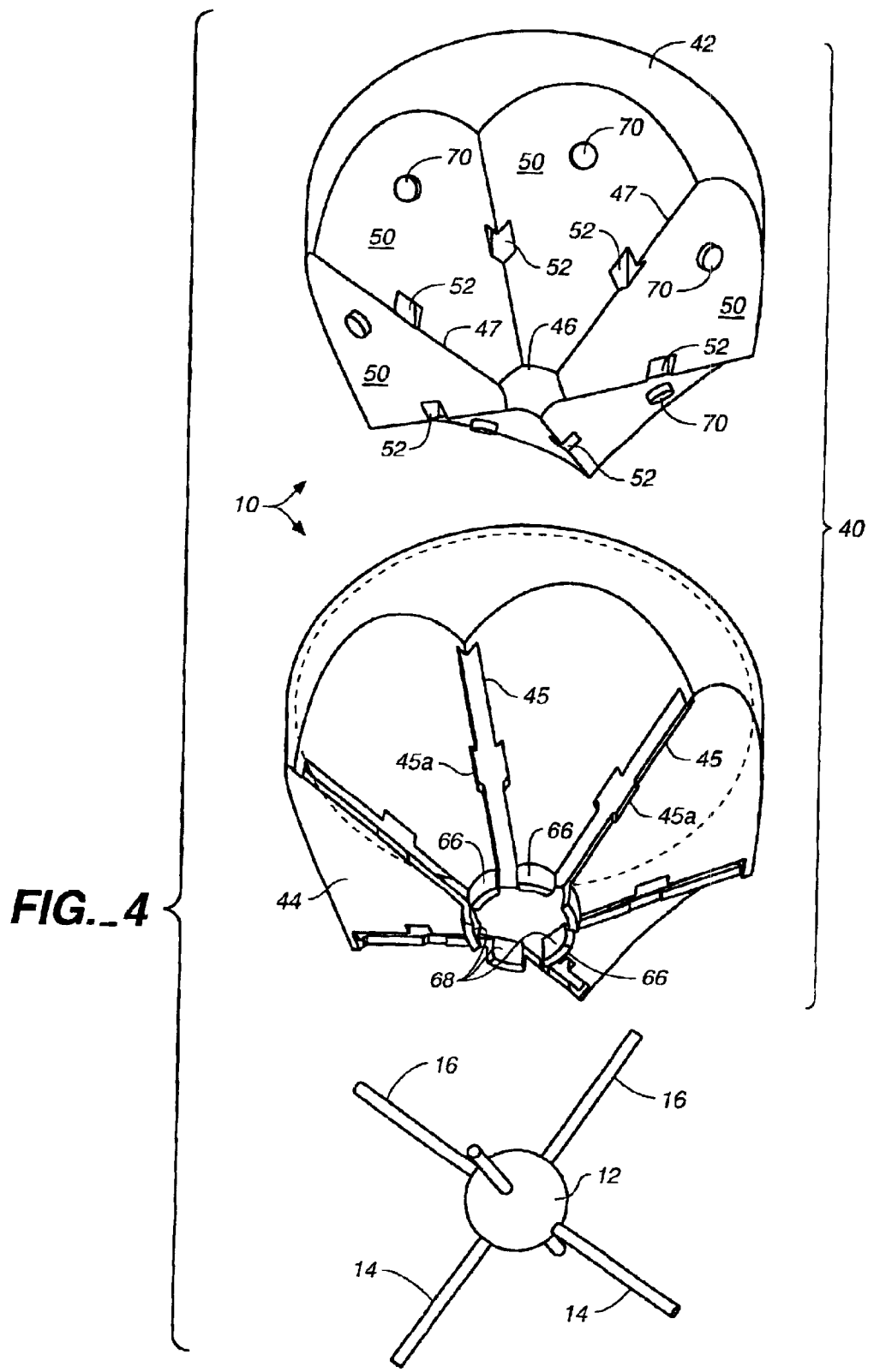
FIG._4

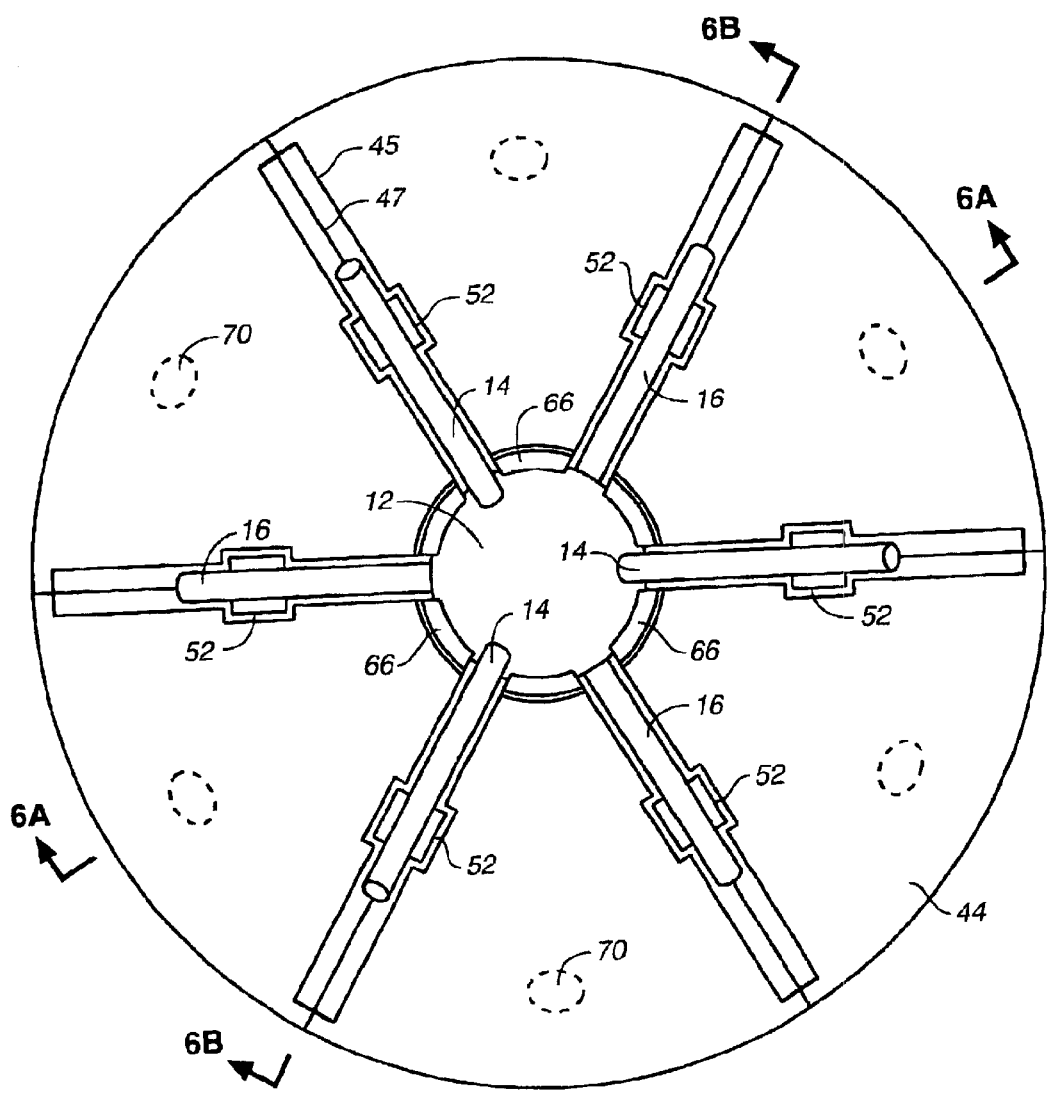
FIG._5

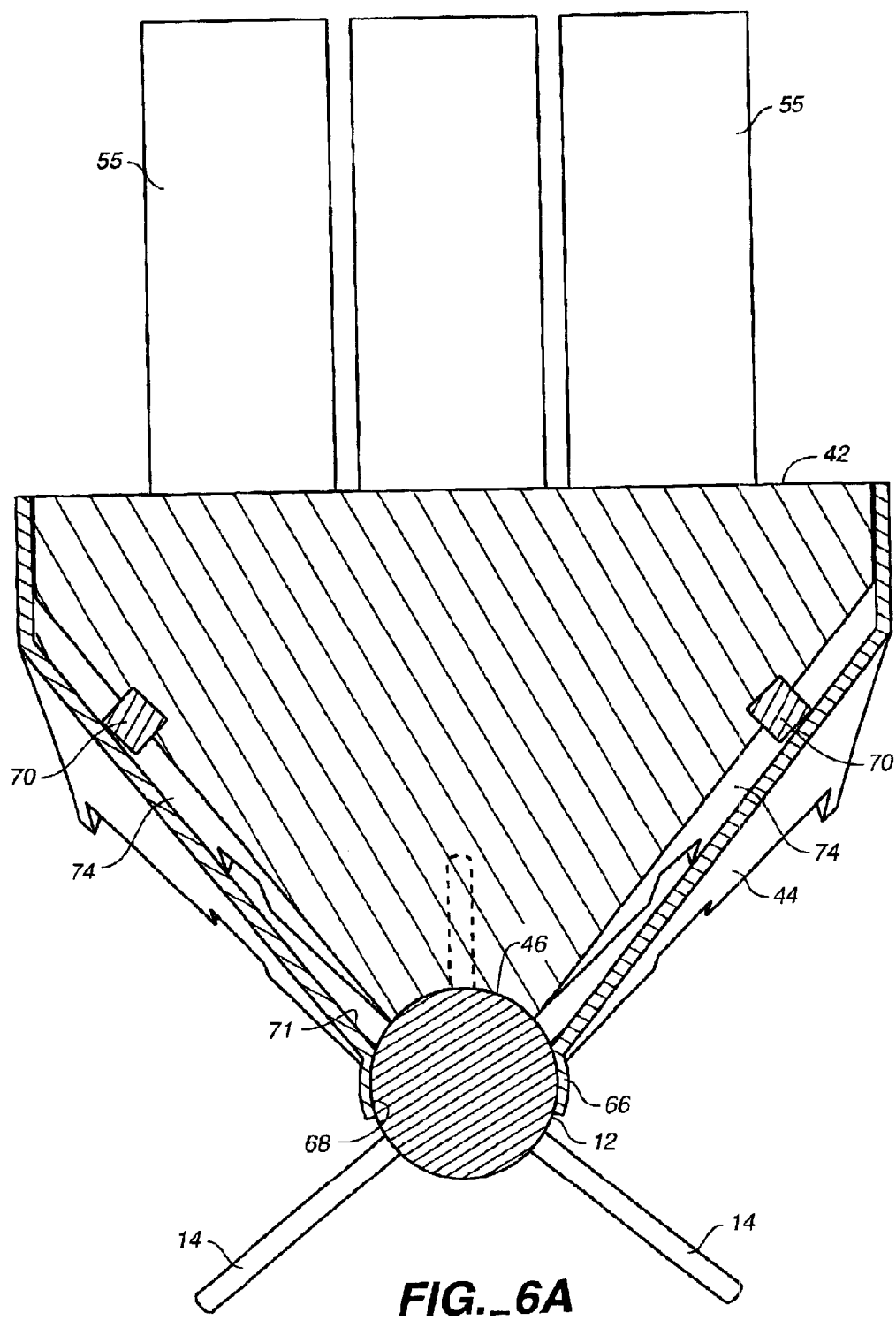
FIG._6A

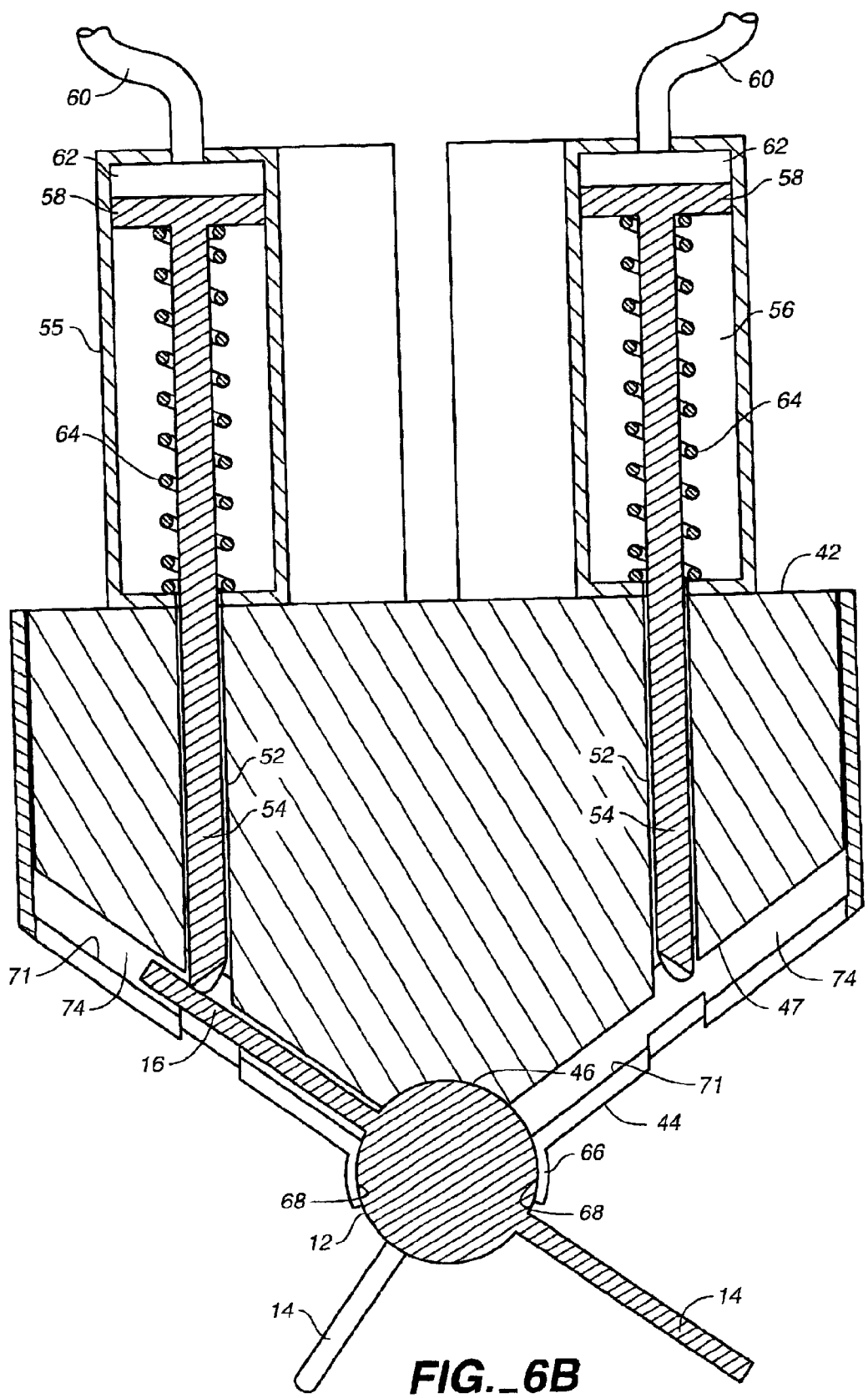
FIG._6B

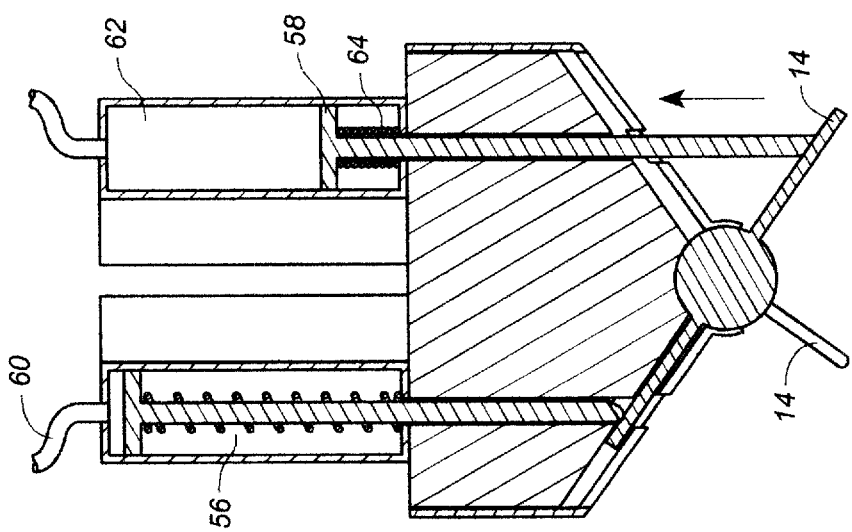
FIG._7C
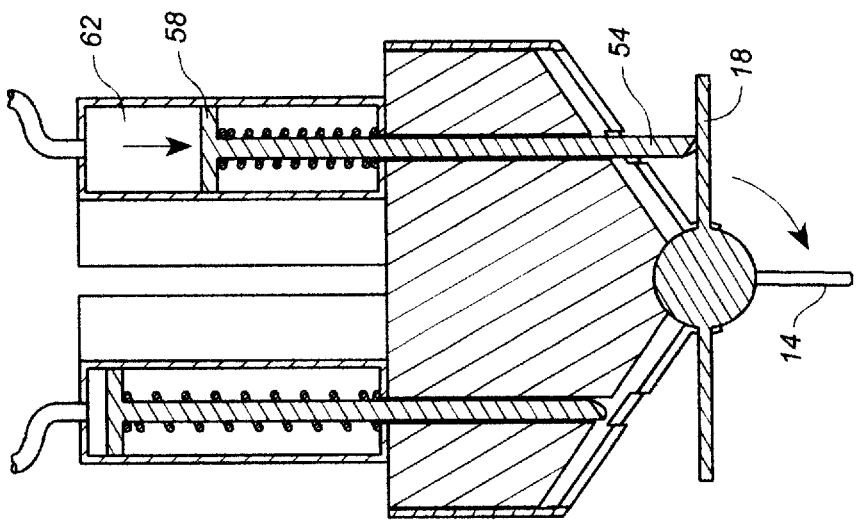
FIG._7B
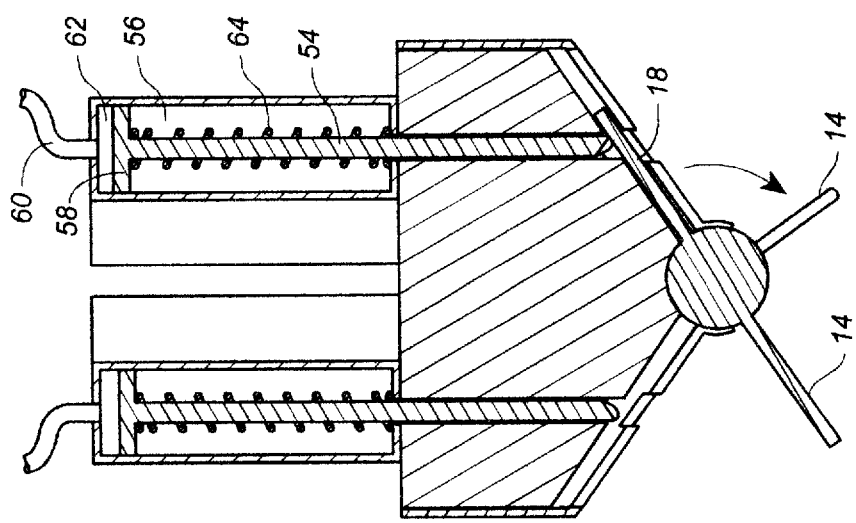
FIG._7A

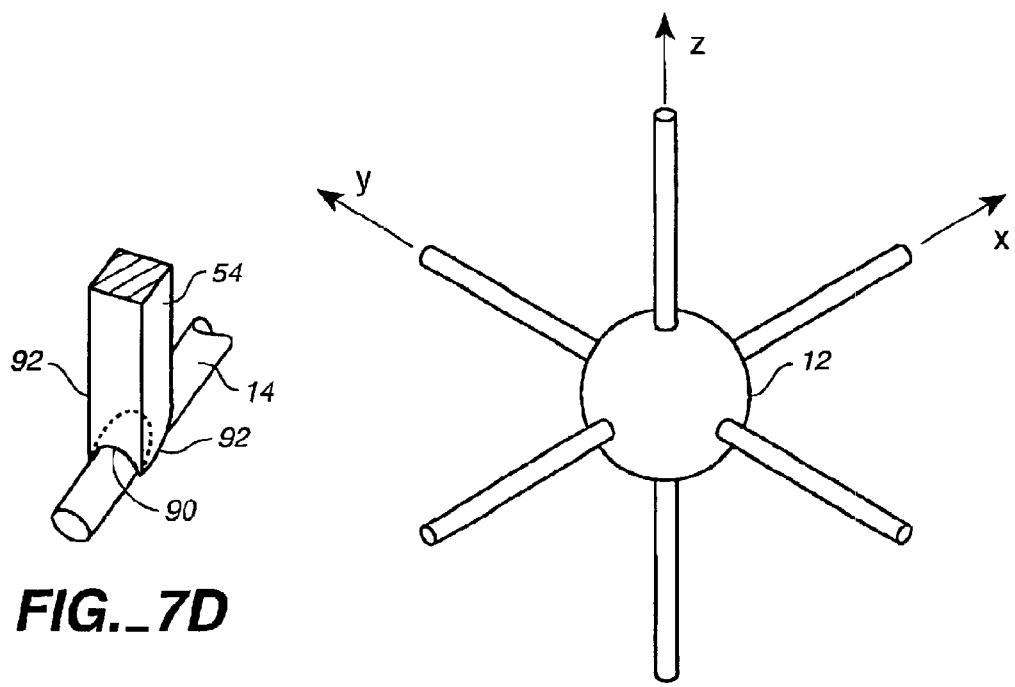
FIG._7D
FIG._8
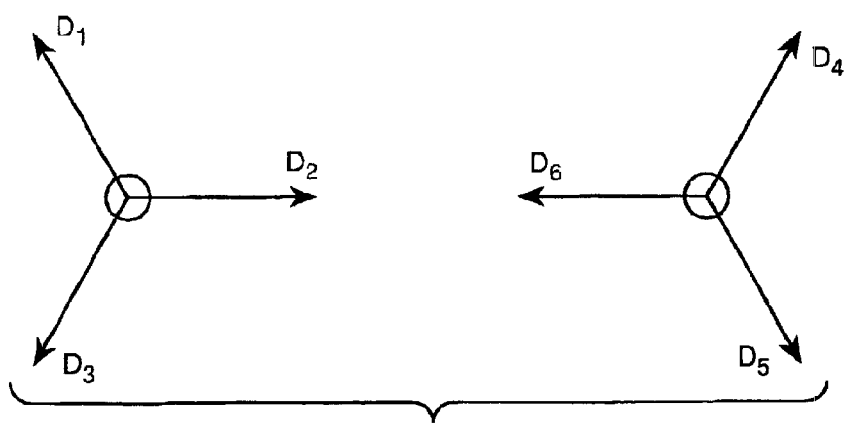
FIG._10
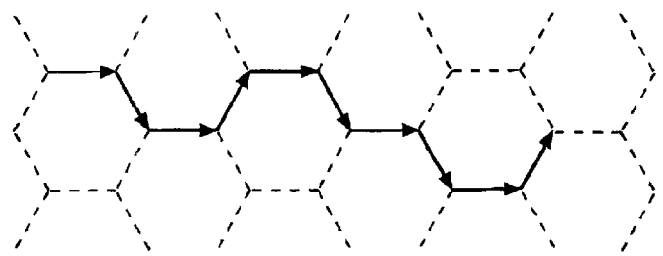
FIG._11

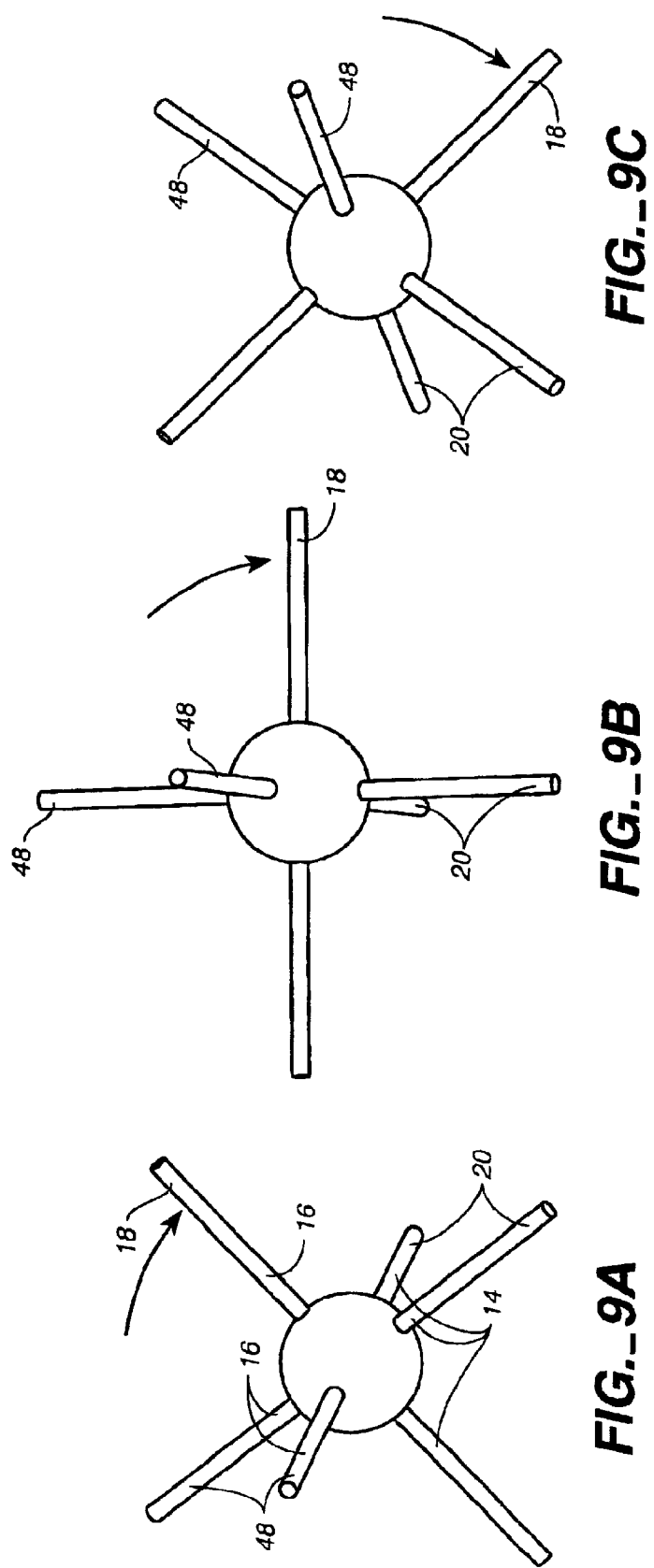

MECHANICAL WALKER

BACKGROUND OF THE INVENTION

1. Field of the Invention

This invention relates to mechanical walkers, and particularly to robotic walking mechanisms having six legs of equal length organized in an X-Y-Z axial relationship extending radially from a central sphere, wherein movement over a surface is accomplished by rotation of the legs and sphere. The invention also relates to a superstructure for conveyance of items supported by a plurality of such walkers.

2. Description of the Related Art

A great deal of effort and attention has been directed toward construction of mechanisms capable of horizontal movement. Myriad applications of the wheel have been designed and built, but they generally require a smooth surface especially as speeds increase. All wheel-reliant machines must incorporate a braking system to prevent movement on slanted or irregular surfaces. The National Aeronautics and Space Administration, universities, and independent research laboratories, have created sophisticated walking and movement devices which employ continuous belt-like tracks, such as used by tanks, numerous wheeled configurations, and sophisticated two-footed walking machines which require lateral support to remain upright. Despite these advances, a need remains for a simple device capable of forward movement which is stable on slanted or rough surfaces, and which has the capability of conveying objects to a remote location. Any such robotic movement device would have enhanced value if capable of being controlled remotely.

SUMMARY OF THE INVENTION

A mechanical walker according to the invention comprises a set of six legs of approximately equal length, extending radially from a central sphere and disposed in an X-Y-Z-type axial relationship. The legs and sphere, when placed on a horizontal surface, assume a natural rest position wherein three low legs rest on the surface, and three high legs extend upward in axial alignment with the three low legs. From the rest position, the legs and sphere can be moved in any of three directions coincident with the direction of extension of each of the high legs. In any one of the three selected directions, in rest position the two lower legs below the selected high leg are referred to as "anchor legs." Movement in the selected direction is accomplished by applying sufficient force on the mechanism to move the high leg forward, rotating the sphere (and legs), until the foot of the high leg rests on the surface with the ends of the two anchor legs. This movement represents a first movement cycle. The apparatus may then be moved in one of three new directions represented by the three "new" high legs through a second movement cycle. Movement through the second cycle is identical to movement of the device through the first cycle, except that the three directions of movement available for the second cycle of movement are sixty degrees offset from the three directions of movement available at the beginning of the first cycle. Subsequent cycles of movement after the second cycle are available, the directions of movement for each cycle offset by sixty degrees from the directions of movement of the previous cycle.

A superstructure comprises a bearing member and shell. The bearing member provides a downward facing bearing surface having a curvature matching that of the outer surface of the sphere. The bearing surface rests against a top portion of the sphere. During each cycle of movement, the two rearward high legs sweep forward as the forward high leg rotates forward and downward to the end of the cycle. The orientation of the sphere is confined as discussed below so that the movement of the high leg through any cycle of movement is restricted to three vertical planes common with a center point of the sphere and offset from each other by one hundred twenty degrees. Hence, the rear high legs are also confined to defined sweep paths. The bearing member extends upwardly from the bearing surface in a six-sided scalloped pattern matching the sweep paths of the rearward high legs in each of the six possible directions of movement available through any two consecutive cycles of movement.

The shell comprises six inwardly biased pads for gripping the equatorial region of the sphere. Spaces between each adjoining pair of pads are sufficiently wide to accommodate the vertical movement of a high leg on its vertical path during a movement cycle. Slots in the shell extending upwardly from each of the spaces confine movement of the high legs to three vertical planes through each movement cycle. That is, they prevent horizontal drift of the high leg during the movement cycle. The shell also forms a plurality of scalloped surfaces between each pair of adjoining slots parallel to and spaced from the scalloped outer surface of the bearing member, defining therebetween sweep channels for preventing the rearward legs from lateral rotation during a movement cycle. The shell is joined to the bearing member, thereby holding the sphere by the six pads, against the bearing surface of the bearing member.

The bearing member includes six vertical bores. An actuating rod disposed in each bore has at its lower end a contact foot for engaging and pushing down a selected high leg. Forward movement is accomplished by pressing down one of the actuating rods, thereby bringing the contact foot into engagement with the selected high leg. Pushing the high leg down forces the mechanism to "walk over" the two anchor legs until the high leg is brought into contact with the surface level of the anchor legs. The actuating rod is then retracted, and a succeeding cycle of movement is initiated by pushing down the actuating rod over a selected one of the three "new" high legs.

A plurality of at least three mechanical walkers can support a platform, chassis, or other means for conveying any desired object. The force necessary for downward movement of the actuating rods can be supplied by numerous means well known to those skilled in the art.

BRIEF DESCRIPTION OF THE ILLUSTRATIONS

FIG. 1 is a perspective view of a mechanical walker according to the invention, comprising an assembly of four mechanical walkers supporting and joined by a conveyance platform.

FIG. 2 is a top perspective view of a mechanical walker according to the invention.

FIG. 3 is a bottom perspective view of the mechanical walker shown in FIG. 2.

FIG. 4 is an exploded lower perspective view of the mechanical walker of FIG. 3.

FIG. 5 is a bottom plan view of the mechanical walker of FIGS. 2 and 3.

FIG. 6A is a side sectional view of the mechanical walker taken along lines 6A of FIG. 5.

FIG. 6B is a side sectional view of the mechanical walker taken along lines 6B of FIG. 5.

FIGS. 7A, 7B, and 7C are side sectional views of the mechanical walker according to the invention showing movement of the sphere and legs through one complete movement cycle.

FIG. 7D is a perspective view of an actuating rod in contact with one of the legs of a mechanical walker according to the invention.

FIG. 8 is a perspective view of a sphere and legs of a mechanical walker according to the invention.

FIGS. 9A, 9B, and 9C are perspective views of the sphere and legs of FIG. 8 showing the beginning, middle, and end positions thereof during a cycle of movement.

FIG. 10 is a schematic representation of the available directions of movement of a mechanical walker according to the invention through a first and second cycles of movement.

FIG. 11 is a schematic diagram of a possible path of movement of a mechanical walker according to the invention.

DETAILED DESCRIPTION OF THE ILLUSTRATED EMBODIMENT

A mechanical walker 10 according to the invention is described below and as shown in the accompanying illustrations. A mechanical walker 10 comprises a set of six legs of approximately equal length, extending radially from a central sphere 12. Referring to FIG. 8, the six legs are organized in an X-Y-Z axial configuration, wherein each axis is formed from a pair of axially aligned legs extending from opposite sides of a central sphere. Each of the three axes is in a right angle relation to the others. The legs and sphere, when placed on a horizontal surface, assume a natural rest position (see FIG. 9A) in which three "low" legs 14 rest on the surface, and the three "high" legs 16, obverse twins of the three "low" legs, extend upward from the sphere. As seen in FIG. 10, from the rest position, the legs and sphere can be moved in any of three directions, $D_1$, $D_2$, and $D_3$, represented by the horizontal direction of extension of each one of the high legs. Referring back to FIG. 9A, in any selected one of the three available directions of movement, the two low legs below the forward high leg 18 in the selected direction of movement may be defined as "anchor legs" 20. Movement is accomplished by applying sufficient force to the mechanism to move the high leg forward in a selected direction of movement, rotating the sphere until the end of the high leg rests on the surface with the ends of the two anchor legs. See FIGS. 9A, 9B and 9C. This movement represents a first movement cycle. At the end of the first movement cycle, the sphere and legs are in a new rest position wherein forward high leg 18 is in the position of a "low" leg along with anchor legs 20, and three "new" high legs are established. See FIG. 9C. The apparatus may then be moved through a second movement cycle in one of three directions, $D_4$, $D_5$, and $D_6$, represented by the three "new" high legs. See FIG. 10. Movement through the second cycle is identical to movement of the device through the first cycle, except that the three directions of movement available for the second cycle of movement ($D_4$, $D_5$, and $D_6$) are offset sixty degrees from the three directions of movement available at commencement of the first cycle ($D_1$, $D_2$, and $D_3$). Subsequent cycles of movement after the second cycle are in like fashion available; the directions of movement for any cycle offset by sixty degrees from the available directions of movement at the beginning of the previous cycle. An illustrative path of movement is graphically illustrated in FIG. 11.

Stated in the simplest terms, movement through one cycle is accomplished by rotating the sphere 12 and legs 14, 16 about an axis of rotation passing through a center point of the sphere, which axis is perpendicular to the selected forward leg and parallel to the surface upon which rest the anchor legs. See FIGS. 9A–9C. There are a great number of methods by which sufficient force may be applied to the mechanism to accomplish the desired movement, in addition to the specific embodiment described below. Downward force may be applied on the high leg, or upward force on the low leg which is the rearward counterpart of the high leg; force can be applied simultaneously to the forward high leg, and to the two rearward high legs to produce a forward-sweeping forward motion consistent with the forward motion of the high leg; or, force can be applied to all high legs as just described and to one low leg. Innumerable combinations of application of force are possible. For example, downward force on a high leg can be generated by weights. Rods used to push or pull the high leg may be actuated by electrical, hydraulic, pneumatic, or jackscrew means. Similarly, upward force on a "low" leg, e.g., the rear low legs, may be generated by extending those legs, by extending a tip of those legs, or by pulling upward. Sideways force can be generated on "high" legs, preferably the two rear high legs, using similar methods.

The force necessary for such motion may be created in many ways, including by application of downward force on a high leg by weights, pulleys, or push-rods. Push-rods may be activated by electric, hydraulic, or pneumatic means. Alternatively, a jack screw may be used to supply the appropriate downward force. Similarly, upward force on a low leg may be generated by any of the above means for application of force on a high leg, and by extending the low leg or expanding or extending a tip of the low leg.

Sideways force on high legs can be generated by push-rods or pull-rods, gear or ratchet mechanisms, or high-pressure gas jets. Alternatively, a torque may be developed internally in the sphere, as by a rotating fly wheel which, when braked, supplies the needed torque in the proper direction.

A superstructure 40, seen in FIGS. 2, 3, and 4, includes a bearing member 42 and shell 44. Bearing member 42 includes bearing surface 46, having a concave curvature matching that of the outer surface of sphere 12. Bearing surface 46 rests against a top portion of the sphere 12 as best seen in FIGS. 6A and 6B. During each movement cycle, as the forward high leg 18 rotates forward and down, two rearward high legs 48 sweep forward, carving out a scalloped pattern. See FIGS. 9A–9C. As explained in detail below, the orientation of the sphere and legs is restricted so that movement of a high leg 16 through any cycle of movement is confined to three vertical planes intersecting at a center point of sphere 12 and offset from each other by 120 degrees. Hence, the sweep paths of rearward high legs 48 are each confined to the above-defined scalloped pattern. Considering the six possible directions of movement available through any two consecutive cycles of movement, it can be seen that rearward high legs 48 carve out six scalloped paths extending upwardly from the top portion of sphere 12. See FIG. 9B. Accordingly, bearing member 42 has scalloped outer surfaces 50 which extend upwardly from bearing surface 46 in a six-sided scalloped pattern shown in FIG. 3 coinciding with the scalloped paths carved out by the high legs. The close adjacency of scalloped outer surfaces 50 of bearing member 42 to the sweeping rearward high legs 48 prevents rotation of the latter about the axis of forward high leg 18 during a movement cycle.

As seen in FIGS. 2, 3, 4, and 5, bearing member 42 includes six vertical bores 52 in direct alignment with the six possible locations of high legs 16 at the beginning of a movement cycle. Depressing an actuating rod 54 resident in one of the vertical bores 52 against high leg 16, as seen in FIGS. 6B and 7A, commences a movement cycle. In the preferred embodiment, each vertical bore comprises a squared or rectilinear channel having an inner face perpendicular to a radius of a vertical axis of the superstructure. Preferably, as best seen in FIG. 7D, each actuating rod has at a bottom portion a curved groove 90 and opposing prominences 92. The groove is slightly larger than the leg such that when the rod moves downward, the prominences extend over opposite sides of the leg. In the preferred embodiment, each actuating rod is squared or rectilinear in cross-section, preventing the rod from twisting in the channel and ensuring proper engagement of the groove 90 and leg 16. As the rod pushes the leg down, the prominences 92 prevent lateral movement of the leg. Referring to FIGS. 7B and 7C, as actuating rod 54 is pressed down, high leg 16 is pushed through a full movement cycle. The view shown in FIG. 7C depicts the position of the apparatus after completion of a full movement cycle. Forward high leg 18 now becomes one of low legs 14. At the end of each movement cycle, actuating rod 54 is retracted fully into bore 52 in preparation for the next movement cycle. FIGS. 6B and 7A through 7C illustrate a housing 55 having a chamber 56 above each actuating rod 54, each actuating rod having a piston head 58. Downward force is created by delivery of pressurized gas through hose 60 into expansion chamber 62, thereby forcing piston head 58 and actuating rod 54 downward. When the pressure is released, spring 64 will return the piston head 58 and actuating rod 54 to the beginning position shown in FIG. 7A.

FIG. 4 shows an exploded view of the sphere 12 and legs 14, 16, shell 44, and bearing member 42. These elements as assembled are best seen in FIGS. 6A and 6B. Shell 44 includes six pads 66, each having a concave face 68 for gripping the equatorial region of sphere 12. Preferably, the faces 68 of pads 66 are constructed of a smooth polycarbonate material which allows sphere 12 to slide freely. Pad faces 68 are of sufficient vertical and horizontal dimension to hold sphere 12 between them without other assistance yet not interfere with movements of the legs.

As seen in FIGS. 6A and 6B, shell 44 slides over bearing member 42. Spacers 70 hold scalloped inner surfaces 71 in spaced disposition from scalloped outer surface 50, defining therebetween sweep channels 74 for forward sweeping motion of rear high legs during a movement cycle. The forward moving rear high legs are thus prevented from lateral rotation by the inner surfaces 71 of shell 44 and outer surfaces 50 of bearing member 42. Assembly of shell 44 and bearing member 42 holds sphere 12 in sliding abutment against bearing surface 46.

As seen in FIG. 3, shell 44 and bearing member 42 are assembled to position slots 45 of shell 44 in radial alignment with crests 47 formed from adjoining scalloped portions of the outer surface 50 of bearing member 42. At the beginning of a motion cycle high legs 16 are poised for downward motion just below crests 47 and just above slots 45. As selected high leg 18 is pushed downward it passes through one of slots 45 which, in addition to the curved groove 90 and prominences 92 of rods 54, helps to prevent horizontal drifting. At the end of each movement cycle three new high legs are positioned as described above just below crests 47 and above slots 45. Referring to FIGS. 3 and 4, slots 45 preferably have a slightly widened portion 45a in vertical alignment with the path of rods 54 to remove any obstruction to the free operation of rods 54 through a movement cycle.

At least three mechanical walkers can support a platform or chassis as a conveyance means. FIG. 1 shows a platform 80 supported by four mechanical walkers 10. The apparatus depicted in FIG. 1 could be combined with a remote control device allowing the operator to select the direction of movement of the device. In this manner, a selected object can be moved to a desired location by remote control.

A mechanical walker has the distinct advantages of being simple and inexpensive to manufacture and can be made to be fully disposable. For example, the mechanical walker shown in FIG. 1 may have application for destruction of land mines. Given the ability to control it remotely and its stability over rough surfaces, the invention has application for negotiating hostile terrain, such as an ocean bed, or the surface of another planet.

There have been thus described and illustrated certain preferred embodiments of a mechanical walker according to the invention. Although the present invention has been described and illustrated in detail, it is clearly understood that the same is by way of illustration and example only, and is not to be taken by way of limitation, the spirit and scope of the present invention being limited only by the terms of the appended claims and their legal equivalents.

I claim:

1. A mechanical walker comprising:

a central sphere, six legs in fixed disposition and extending along three orthogonal axes relative to said sphere, each of said legs having a distal end, means for application of sufficient force to at least one of said legs to move said sphere from a first rest position to a second rest position in any selected one of six planar directions disposed at sixty degree angles relative to said sphere, said distal ends of a first set of three of said legs resident in an anchor plane in said first rest position, and said distal ends of a second set of three of said legs resident in said anchor plane in said second rest position.

2. The mechanical walker of claim 1 wherein:

in said first rest position said legs have a forward high leg and two anchor legs, said distal ends of said anchor legs are each resident in an anchor plane and said distal end of said high leg is disposed in a high plane parallel to and spaced above said anchor plane, and in said second rest position said distal ends of said forward high leg and said anchor legs are disposed in said anchor plane.

3. The mechanical walker of claim 2 wherein:

in said first rest position said sphere is capable of movement in a first set of three of said directions, said three directions disposed at 120 degree angles relative to said sphere.

4. The mechanical walker of claim 3 wherein:

in said second rest position said sphere is capable of movement in a second set of three of said directions, said second set of three directions disposed at 120 degree angles relative to said sphere and at 60 degree angles relative to said first set of three directions.

5. The mechanical walker of claim 1 further comprising:

a superstructure for holding said sphere, said superstructure supported by said sphere, said superstructure including a plurality of at least six pads, each said pad having a concave face matching a curvature of an outer surface of said sphere, said pads disposed in a horizontal plane common with a center point of said sphere in a spaced radial configuration around said sphere, said pads having side edges bounding spaces between adjoining pairs of said pads, each said space sufficient for vertical passage therethrough of one of said legs, said pad faces in sliding engagement with said outer surface of said sphere, said pads inwardly biased with sufficient force to hold said sphere.

6. The mechanical walker of claim 5 wherein:

said spaces are disposed radially around said sphere at relative angles of approximately sixty degrees.

7. The mechanical walker of claim 5 wherein:

said pads are in sliding engagement with an equatorial region of said sphere.

8. The mechanical walker of claim 5 wherein:

said faces of said pads have sufficient vertical dimension to hold said sphere.

9. The mechanical walker of claim 5 wherein;

said concave face of each of said pads defines a vertical arc of approximately 20 degrees, said are having an origin at a center point of said sphere.

10. The mechanical walker of claim 8 wherein:

said concave face of each of said pads defines a vertical arc of approximately 20 degrees, said arc having an origin at a center point of said sphere.

11. The mechanical walker of claim 5 wherein:

said superstructure further comprises a shell member, said shell member defining a plurality of vertical slots, each slot extending upwardly from one of said spaces and having a sufficient width for passage therethrough of s aid one of said high legs, each said slot confining movement of said high leg to a vertical plane common with a center point of said sphere.

12. The mechanical walker of claim 11 wherein:

said plurality of slots comprises six slots disposed radially at approximately sixty degree angles relative to said sphere.

13. The mechanical walker of claim 11 wherein:

said superstructure further comprises a bearing member, said bearing member including a bearing surface having a concave curvature matching a curvature of an outer surface of said sphere, said bearing surface for sliding engagement with and bearing on a top portion of said sphere.

14. The mechanical walker of claim 13 wherein:

said legs are movable between a first rest position and a second rest position, in said first rest position said legs have a forward high leg, two rear high legs, and two anchor legs, said distal ends of said anchor legs are each resident in an anchor plane and said distal end of said high leg is disposed in a high plane parallel to and spaced above said anchor plane, and in said second rest position said distal ends of said forward high leg and said anchor legs are disposed in said anchor plane, during movement between said first rest position and said second rest position, said rear high legs tracing dual scalloped paths behind said forward high leg, such that in said six directions said rear high legs trace a plurality of scalloped paths, and said bearing member further comprising a plurality of concave outer surfaces extending up from said bearing surface, said plurality of concave surfaces bordering said plurality of scalloped paths of said rear high legs, said concave outer surfaces restricting lateral travel of said rear high legs during said cycle of movement in any of said directions.

15. The mechanical walker of claim 14 wherein:

said shell member further comprises a plurality of convex inner surfaces, said convex inner surfaces in spaced adjacency to said concave outer surfaces of said bearing member therebetween defining a plurality of scalloped channels coinciding with said plurality of scalloped paths of said rear high legs, said convex inner surfaces of said shell member restricting lateral travel of said rear high legs during said movement between said first and second rest positions in any of said directions.

16. The mechanical walker of claim 15 further comprising:

a plurality of spacers disposed between said plurality of convex inner surfaces and said plurality of concave outer surfaces.

17. The mechanical walker of claim 15 wherein:

said plurality of scalloped channels is disposed radially around a vertical axis of said superstructure at angles of approximately sixty degrees.

18. The mechanical walker of claim 2 further comprising:

a superstructure for holding said sphere, said superstructure supported by said sphere, said means for application of sufficient force comprises said superstructure having six vertical bores disposed radially around a vertical axis of said superstructure at angles of approximately sixty degrees, an actuating rod in sliding disposition in each of said bores, each said rod for pushing downward on one of said forward high legs for moving said sphere and said legs between said first rest position and said second rest position.

19. The mechanical walker of claim 18 wherein:

said vertical bores comprise rectilinear channels each having an inner face perpendicular with a radius of a center of said superstructure, and said actuating rod is rectilinear in cross-section.

20. The mechanical walker of claim 13 wherein:

said means for application of sufficient further comprises said superstructure having six vertical bores disposed radially around a vertical axis of said superstructure at angles of approximately sixty degrees, an actuating rod in sliding disposition in each of said bores, each said rod for pushing downward on one of said forward high legs for moving said sphere and said legs between said first rest position and said second rest position.

21. The mechanical walker of claim 20 wherein:

said plurality of bores are in radial alignment with said plurality of slots.

22. The mechanical walker of claim 21 wherein:

said vertical bores comprise rectilinear channels each having an inner face perpendicular with a radius of a center of said superstructure, and said actuating rod is rectilinear in cross-section.

23. A mechanical walker comprising:

a central sphere, six legs of approximately equal length extending along three orthogonal axes relative to said sphere, a superstructure for holding said sphere, said superstructure having a shell member, said shell including a plurality of at least six pads, each said pad having a concave face matching a curvature of an outer surface of said sphere, said pads disposed in a spaced radial configuration around said sphere in a horizontal plane common with a center point of said sphere, said pads having side edges, said side edges defining spaces between adjoining pairs of said pads, each said space sufficient for vertical passage therethrough of one of said legs, said pad faces in sliding engagement with said outer surface of said sphere, said pads inwardly biased with sufficient force to hold said sphere, said spaces disposed radially around said sphere at relative angles of approximately 60 degrees, said shell member defining a plurality of vertical slots, each slot extending upwardly from one of said spaces and having a sufficient width for passage therethrough of one of said legs, each said slot confining movement of said leg to a vertical plane common with a center point of said sphere said legs are movable between a first rest position and a second rest position, in said first rest position said legs have a forward high leg and two anchor legs, said distal ends of said anchor legs are each resident in an anchor plane and said distal end of said high leg is disposed in a high plane parallel to and spaced above said anchor plane, and in said second rest position said distal ends of said forward high leg and of said anchor legs are disposed in said anchor plane, and means for application of sufficient force to move said legs between said first rest position and said second rest position in any selected one of said six directions.

24. The mechanical walker of claim 23 wherein:

said superstructure further comprises a bearing member, said bearing member including a bearing surface having a concave curvature matching said curvature of said outer surface of said sphere, said bearing surface for bearing on a top portion of said sphere in sliding engagement therewith, in each of said six directions during movement between said first rest position and said second rest position two rear high legs of said legs tracing dual scalloped paths behind said forward high leg, such that in said six directions said rear high legs trace a plurality of scalloped paths, said bearing member further having a plurality of concave outer surfaces extending up from said bearing surface, said plurality of concave-surfaces bordering said scalloped paths of said rear high legs, said shell member further comprising a plurality of convex inner surfaces, said plurality of convex inner surfaces of said shell member in spaced adjacency to said plurality of concave outer surfaces of said bearing member defining therebetween a plurality of scalloped channels coinciding with said plurality of scalloped paths, said inner surfaces of said shell member and said outer surfaces of said bearing member restricting lateral travel of said rear high legs during said movement between said first and second rest positions in any of said directions.

25. A mechanical walker comprising:

a central sphere, six legs in fixed disposition and extending along three orthogonal axes relative to said sphere, each of said legs having a distal end, a superstructure for holding said sphere, said superstructure having a shell member and a bearing member, said shell member including a plurality of at least six pads, each said pad having a concave face matching a curvature of an outer surface of said sphere, said pads disposed in a spaced radial configuration around said sphere in a horizontal plane common with a center point of said sphere, said pads defining spaces between adjoining pairs thereof, each said space sufficient for vertical passage therethrough of one of said legs, said pad faces in sliding engagement with said outer surface of said sphere, said pads inwardly biased with sufficient force to hold said sphere, said spaces disposed radially around said sphere at relative angles of approximately 60 degrees, said shell member defining a plurality of vertical slots, each slot extending upwardly from one of said spaces and having a sufficient width for passage therethrough of one of said legs, each said slot confining movement of said leg to a vertical plane common with a center point of said sphere, said sphere freely moveable such that said legs are moveable between a first rest position and a second rest position, in said first rest position said legs capable of moving in three directions, each of said three directions disposed at 120 degrees from the other two directions, in any selected one of said directions, said legs including one forward high leg and two anchor legs, said distal ends of said anchor legs each resident in a common anchor plane, and said distal end of said high leg disposed in a high plane above said anchor plane, in said second rest position said distal end of said high leg and said distal ends of said anchor legs disposed in said anchor plane, means for application of sufficient force to move said legs between said first rest position and said second rest position, such that said sphere moves in the direction of said forward high leg, said bearing member of said superstructure including a bearing surface having a concave curvature matching said curvature of said outer surface of said sphere, said bearing surface for bearing on a top portion of said sphere in sliding engagement therewith, during movement of said forward high leg between said first and second rest positions, in each of said three directions of movement two rearward high legs tracing dual scalloped paths behind said forward high leg, and said bearing member further having a plurality of concave outer surfaces extending up from said bearing surface, said plurality of concave surfaces closely tracking said scalloped paths of said rearward high legs, said shell member further comprising a plurality of convex inner surfaces, said inner surfaces in spaced relation with said concave outer surfaces of said bearing member, each of said convex inner surfaces of said shell member opposing one of said concave outer surfaces of said bearing member therebetween defining a scalloped channel coinciding with one of said scalloped paths for free passage therethrough of one of said rearward high legs, said plurality of concave surfaces of said bearing member and said inner surfaces of said shell member for restricting lateral travel of said high legs during said movement.

26. The mechanical walker of claim 25 further comprising:

said shell member having a plurality of semi-flexible flanges, each flange depending from a top skirt, each flange having at a bottom portion thereof one of said pads, said bearing member disposed within said shell member.

* * * * *

UNITED STATES PATENT AND TRADEMARK OFFICE
CERTIFICATE OF CORRECTION

PATENT NO.   : 6,491,119 B1
DATED        : December 10, 2002
INVENTOR(S)  : Franklin D. Neu It is certified that error appears in the above-identified patent and that said Letters Patent is hereby corrected as shown below:

Column 7,
Lines 30-31, change "s aid" to -- said --.

Column 8,
Line 39, insert the word -- force -- after the word "sufficient" and delete "further"

Signed and Sealed this

Eighth Day of April, 2003

JAMES E. ROGAN
*Director of the United States Patent and Trademark Office*